United States Patent
Parsons et al.

(10) Patent No.: US 11,475,135 B2
(45) Date of Patent: Oct. 18, 2022

(54) ORCHESTRATION OF VULNERABILITY SCANNING AND ISSUE TRACKING FOR VERSION CONTROL TECHNOLOGY

(71) Applicant: Target Brands, Inc., Minneapolis, MN (US)

(72) Inventors: Adam Konrad Parsons, Brooklyn Park, MN (US); Karthik Ramesh, Ham Lake, MN (US); Mercedes Leigh Cox, Falcon Heights, MN (US)

(73) Assignee: Target Brands, Inc., Minneapolis, MN (US)

( * ) Notice: Subject to any disclaimer, the term of this patent is extended or adjusted under 35 U.S.C. 154(b) by 190 days.

(21) Appl. No.: 16/206,531

(22) Filed: Nov. 30, 2018

(65) Prior Publication Data

US 2020/0175172 A1    Jun. 4, 2020

(51) Int. Cl.
  *G06F 21/57*    (2013.01)
  *G06F 11/36*    (2006.01)
  *G06F 8/71*     (2018.01)

(52) U.S. Cl.
  CPC .............. *G06F 21/577* (2013.01); *G06F 8/71* (2013.01); *G06F 11/3604* (2013.01); *G06F 2221/033* (2013.01)

(58) Field of Classification Search
  CPC ...... G06F 21/577; G06F 11/3604; G06F 8/71; G06F 2221/033; G06F 8/70; G06F 8/77; G06F 11/368
  See application file for complete search history.

(56) References Cited

U.S. PATENT DOCUMENTS

| | | |
|---|---|---|
| 8,584,079 B2 | 11/2013 | Yassin et al. |
| 8,776,239 B2 | 7/2014 | De Keukelaere et al. |
| 9,104,806 B2 | 8/2015 | Shann et al. |
| 9,632,771 B2 | 4/2017 | Toub |
| 9,684,507 B2 | 6/2017 | Mallisetty et al. |
| 9,965,633 B2 | 5/2018 | Brucker et al. |
| 10,158,660 B1 * | 12/2018 | Reguly ................. G06F 21/577 |
| 10,303,464 B1 * | 5/2019 | Wolfson .............. G06F 11/3664 |
| 10,579,803 B1 * | 3/2020 | Mueller ................ G06F 21/577 |

(Continued)

FOREIGN PATENT DOCUMENTS

CN    108319854 B  *  9/2000  ........... G06F 21/562

OTHER PUBLICATIONS

Pham, Detection of Recurring Software Vulnerabilities, Iowa State University Digital Repository, 59 pages, 2010.

*Primary Examiner* — Harunur Rashid
(74) *Attorney, Agent, or Firm* — Theodore M. Magee; Westman, Champlin & Koehler, P.A.

(57) ABSTRACT

A computer-implemented method includes scanning changed computer instructions to detect vulnerabilities when the changed computer instructions are committed to a version control repository wherein the changed computer instructions comprise changes to a previous version of computer instructions. A vulnerability associated with an open issue for the previous version of computer instructions is determined to not be present in the vulnerabilities detected in the changed computer instructions and computer instructions are sent to close the open issue automatically based on the determination that the vulnerability is not present in the changed computer instructions.

18 Claims, 18 Drawing Sheets

(56) References Cited

U.S. PATENT DOCUMENTS

| | | | |
|---|---|---|---|
| 2006/0218635 A1* | 9/2006 | Kramer | G06F 21/57 |
| | | | 726/22 |
| 2013/0167238 A1* | 6/2013 | Russell | G06F 21/577 |
| | | | 726/25 |
| 2013/0179863 A1 | 7/2013 | Vangala et al. | |
| 2016/0291970 A1* | 10/2016 | Mallisetty | G06F 8/77 |
| 2017/0139815 A1 | 5/2017 | D'Andrea et al. | |
| 2017/0212751 A1 | 7/2017 | Mak et al. | |
| 2017/0286692 A1 | 10/2017 | Nakajima et al. | |
| 2018/0018165 A1 | 1/2018 | Kim et al. | |
| 2018/0101465 A1 | 4/2018 | Keinan | |
| 2018/0129497 A1 | 5/2018 | Biddle et al. | |
| 2018/0336356 A1* | 11/2018 | Papaxenopoulos | G06F 21/563 |
| 2018/0349611 A1* | 12/2018 | Smith | H04L 29/06904 |

\* cited by examiner

Orchestration would like to modify their authorized permissions

Orchestration by Product-Security
would like access to:

Your Account (User Name)
Verify your Version Control account

Resources
Determine what resources both you and Orchestration can access

Actions
Enable you to trigger actions on Version Control System from within Orchestration Orchestration has been installed on 1 account you have access to: tts-pse.

Learn more about Orchestration

AUTHORIZE ORCHESTRATION

Use_Of_Hardcorded_Password @ /sast-service/src/main/java/Main.java [master] #1

[Open] UserName opened this issue 3 minutes ago – 1 comment

Product-Security commented 3 minutes ago [Owner]

Use_Of_Hardcoded_password issue exists @ /sast-service/src/main/java/Main.java in branch master ← 1102     ↘ 1110

The application uses a single, hard-coded password PASSWORD_SERVER for authentication purposes, either using it to verify users' identified, or to access another remote system. This password at line 41 of /sast-service/src/main/java/Main.java appears in the code as plaintext, and cannot be changed without rebuilding the application   1106

Severity: Low ← 1104
CWE:259
Vulnerability details and guidance
Lines: 41 ← 1108

Code (Line#41):

@XmlEmumValue ("PasswordServer")

Product-Security commented 13 seconds ago [Owner]

This issue still exists. Please add label 'false-positive' to remove from scope of SAST results

Use_Of_Hardcorded_Password @ /sast-service/src/main/java/Main.java [master] #1

[Closed] UserName opened this issue 6 minutes ago - 2 comments

Product-Security commented 6 minutes ago　　　　　　　　　[Owner]

Use_Of_Hardcoded_password issue exists @ /sast-service/src/main/java/Main.java in branch master The application uses a single, hard-coded password PASSWORD_SERVER for authentication purposes, either using it to verify users' identified, or to access another remote system. This password at line 41 of /sast-service/src/main/java/Main.java appears in the code as plaintext, and cannot be changed without rebuilding the application Severity: Low
CWE:259
Vulnerability details and guidance
Lines: 41

---

Code (Line#41):

@XmlEmumValue ("PasswordServer")

Product-Security commented 3 minutes ago　　　　　　　　　[Owner]

This issue still exists. Please add label 'false-positive' to remove from scope of SAST results Product-Security closed this 2 minutes ago Product-Security commented 2 minutes ago　　　　　　　　　[Owner]

This issue no longer exists.

Use_Of_Hardcorded_Password @ /sast-service/src/main/java/Main.java [master] #1

[Closed] UserName opened this issue 2 minutes ago - 0 comments

Product-Security commented 6 minutes ago [Owner]

Use_Of_Hardcoded_password issue exists @ /sast-service/src/main/java/Main.java in branch master The application uses a single, hard-coded password PASSWORD_SERVER for authentication purposes, either using it to verify users' identified, or to access another remote system. This password at line 41 of /sast-service/src/main/java/Main.java appears in the code as plaintext, and cannot be changed without rebuilding the application Severity: Low
CWE:259
Vulnerability details and guidance
Lines: 41

Code (Line#41):

@XmlEmumValue ("PasswordServer")

Product-Security commented 6 minutes ago [Owner]

This issue still exists. Please add label 'false-positive' to remove from scope of SAST results Product-Security closed this 5 minutes ago Product-Security commented 5 minutes ago [Owner]

This issue no longer exists.

Product-Security commented a minute ago

This issue still exists. Please add label 'false-positive' to remove from scope of SAST results Product-Security reopened this a minutes ago

```
┌─────────────────────────────────────────────────────────────────────┐
│ Use_Of_Hardcoded_Password @ /sast-service/src/main/java/Main.java [master] │
│ ┌────┐ ┌───────┐ ┌──────┐ ┌──────┐ ┌─────────────────┐ ┌───────────┐ │
│ │Edit│ │Comment│ │Assign│ │More ▼│ │Set to In Progress│ │Set to Done│ │
│ └────┘ └───────┘ └──────┘ └──────┘ └─────────────────┘ └───────────┘ │
│ Details────────────────────────────────────────────────────────────  │
│   Type:      ▣ Defect    ╭─1602                                      │
│   Priority:  ↓ 4-Low   ⟩                                             │
│   Labels:     ┌─────────────┐┌────────────────┐┌────────────────┐┌─────────┐ │
│               │branch:master││owner:UserName  ││repo:sast-service││spotlight│ │
│               └─────────────┘└────────────────┘└────────────────┘└─────────┘ │
│ Description ───────────────────────────────────────────────────────  │
│ Use_Of_Hardcoded_Password issue exists @ /sast-service/src/main/java/│
│ Main.java in branch master                 ╰──1608                   │
│ The application uses a single, hard-coded password PASSWORD_SERVER for│
│ authentication purposes, either using it to verify users' identities, or to access │
│ another remote system. This password at line 41 of /sast-service/src/main/│
│ java/Main.java appears in the code as plaintext, and cannot be changed without │
│ rebuilding the application.                                          │
│ Owner:       UserName              ⟩ 1604                            │
│ Repository:  sast-service                                            │
│ Branch:      master                                                  │
│ Severity:    Low                                                     │
│ CWE:         259                                                     │
│ Vulnerability details and guidance                                   │
│ Lines:       41  ⟋─1606                                              │
│ ─────────────────────────────────────────────────────────────────── │
│ Code (Line #41):                                                     │
│    @XmlEnumValue ("PasswordServer")                                  │
└─────────────────────────────────────────────────────────────────────┘
                              1600
```

FIG. 16

Scan has completed for UserName/video with 3 issues found

Wednesday, September 12, 2018 at 10:46 AM
Show Details

Your static code analysis scan has successfully completed!

Repository: UserName/video
Branch: trial-1

Starting at Mon, 12 Mar 2018 15:40:05 GMT, 129 files were scanned in 2 minutes 30 seconds

---

Scan: 1108251, Project: 19721, Preset: A11-V1

RESULTS
=======

| Type | Severity | Line# | File |
|---|---|---|---|
| Reflected_XSS_All_Clients | High | 56 | /services/src/main/java/com/controller/spi/badgeController.java |
| Use_Of_Hardcoded_Password | Low | 41 | /services/src/main/java/portal/SourceControlProtocolType.java |
| Use_Of_Hardcoded_Password | Low | 41 | /services/src/main/java/sdk/SourceControlProtocolType.java |

ORCHESTRATION OF VULNERABILITY SCANNING AND ISSUE TRACKING FOR VERSION CONTROL TECHNOLOGY

BACKGROUND

In software development, it is known that certain code text can create security vulnerabilities that allow hackers to gain access to data or stop the execution of the code. To prevent this from occurring, software code is scanned while it is under development to determine if it contains any known security vulnerabilities.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes scanning changed computer instructions to detect vulnerabilities when the changed computer instructions are committed to a version control repository wherein the changed computer instructions comprise changes to a previous version of computer instructions. A vulnerability associated with an open issue for the previous version of computer instructions is determined to not be present in the vulnerabilities detected in the changed computer instructions and computer instructions are sent to close the open issue automatically based on the determination that the vulnerability is not present in the changed computer instructions.

In accordance with a further embodiment, a computer server includes a memory and a processor. The memory contains instructions and a database comprising vulnerabilities detected in a previous version of a branch of computer code. The processor executes the instructions in the memory to perform steps including receiving vulnerabilities detected in a last-committed version of the branch of computer code and determining that a vulnerability stored in the database for the previous version of the branch of computer code is not in the received vulnerabilities for the last-committed version of the branch of computer code. The processor then instructs an issue tracker to close an issue opened for the vulnerability for the branch of code.

In accordance with a still further embodiment, a method includes receiving an indication that a merge of a head branch of computer instructions into a base branch of computer instructions has been committed to a version control repository. In response to the indication, a vulnerability detected in the head branch before the merge that was not detected in the base branch before the merge is identified and an indication that the vulnerability is present in the base branch is stored.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is an example user interface granting permission to a vulnerability orchestration application in accordance with one embodiment.

FIG. 4 provides a user interface allowing a user to indicate which repositories a vulnerability orchestration application should be installed on.

FIG. 12 provides an example user interface displayed when a security vulnerability continues to be present in a branch.

FIG. 13 provides an example user interface displayed when a security vulnerability is removed from a branch.

FIG. 14 provides an example user interface when a security vulnerability reappears in a branch.

FIG. 16 provides a second example of an issue user interface when a code vulnerability first appears in a branch.

FIG. 17 provides an example email when a code vulnerability initially appears in a branch.

DETAILED DESCRIPTION

The embodiments described below improve a technology that permits collaborative software develop while ensuring that the resulting software does not include security vulnerabilities. In particular, the embodiments provide a vulnerability orchestration application that works with a version control system, a static application security testing service and an issue tracking service to automatically initiate vulnerability testing upon certain events occurring in the version control system and automatically opening and closing issues generated from the vulnerability scanning. The various embodiments improve the technology by automatically closing currently open issues when a user commits code to a version control system and the committed code no longer includes a previously identified security vulnerability and by setting issues for merged branches without requiring rescanning of the merged branches.

Figure 1:
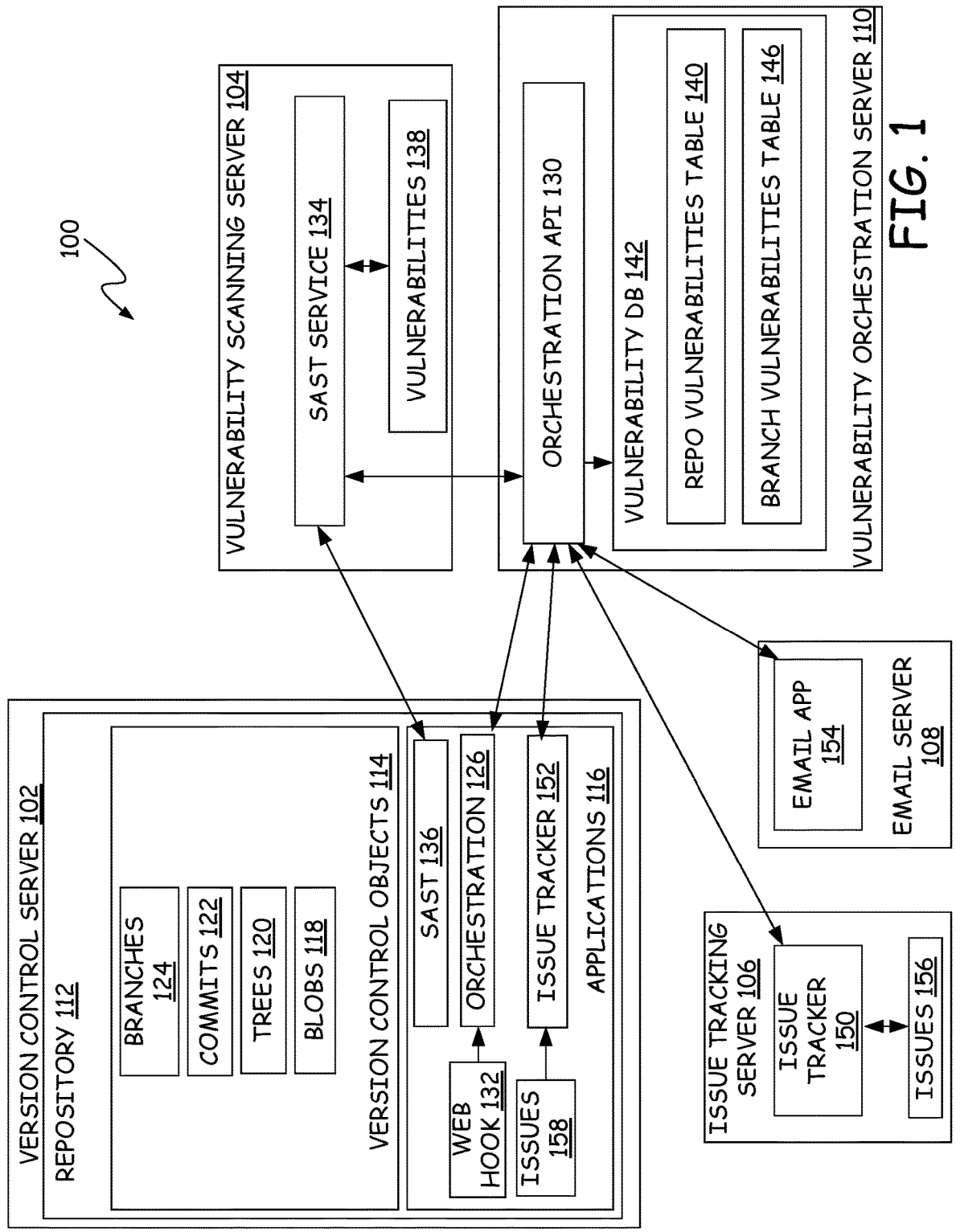
FIG. 1 is block diagram of a system in accordance with one embodiment.

FIG. 1 provides a block diagram of a system 100 in accordance with one embodiment. System 100 includes a version control server 102, a vulnerability scanning server 104, an issue tracking server 106, an email server 108 and a vulnerability orchestration server 110.

Version control server 102 maintains a version control system consisting of one or more repositories, such as repository 112 containing version control objects 114 and version control applications 116. Version control objects 114 include a collection of pointers and files that record and provide access to different versions of code files. In accordance with one embodiment, each version of a code file is referred to as a blob 118 where various blobs can be grouped together into trees 120 consisting of a group of pointers to the blobs that make up the tree. When a tree is committed to repository 112, a commit 122 is generated that points to the tree and to a previous commit 122 that the code in the tree is based upon and that provides information about the committer, the date of the commit, the original author and the date the other first committed the code. Multiple commits can be based on the same common ancestor commit thereby forming a forking structure. Each commit is represented by a checksum value representing a hash of all of the information in the commit. Because each hash is likely to be unique within a repository, the hashes of the commits are used as the identifiers for the commits.

Branches 124 are pointers to particular commits. When a branch is selected, the code in the commit pointed to by the branch is loaded into a working directory. When changes are made to the code, and the changes are committed, a new commit is formed and the branch pointer is automatically moved to point to the new commit. It is also possible to merge two branches that fork from a common ancestor commit. In such merge operations, one of the branches is designated a head branch and the other is designated as a base branch. The head branch is said to be merged into the base branch such that changes in the code found in the last commit of the head branch relative to the common ancestor commit are incorporated into the code found in the last commit of the base branch. This merge code is then committed to the repository to form a merged commit. After the merge, the base branch is moved to point to the merged commit.

Version control applications 116 include add-on applications to the version control server 102 that provide additional functionality beyond simple version control. In accordance with one embodiment, an orchestration application 126 provides orchestration of vulnerability scanning and issue tracking based on version control events that occur in version control server 102. In accordance with one embodiment, orchestration application 126 invokes orchestration API 130 on vulnerability orchestration server 110 to preform various orchestration functions that link version control events to vulnerability scanning and issue tracking. Version control applications 116 also include a Static Application Security Testing (SAST) application, which works with SAST services 134 on vulnerability scanning server 104 to scan committed code for known security vulnerabilities and an internal issue tracker 152 that is selectively used to track issues created for found vulnerabilities. Such issues can alternatively or additionally be tracked using an external issue tracker 150 on issue tracking server 106 or email application 154 on email server 108.

Before orchestration application 126 can be used on version control server 102, it must be authorized to access repository 112. FIG. 2 provides an example user interface 200 that is provided to the user to receive authorization to access the users account information and repositories and to take certain version control system actions from within the orchestration application. User interface 200 includes control 202 for giving the orchestration application these permissions.

Figure 3:
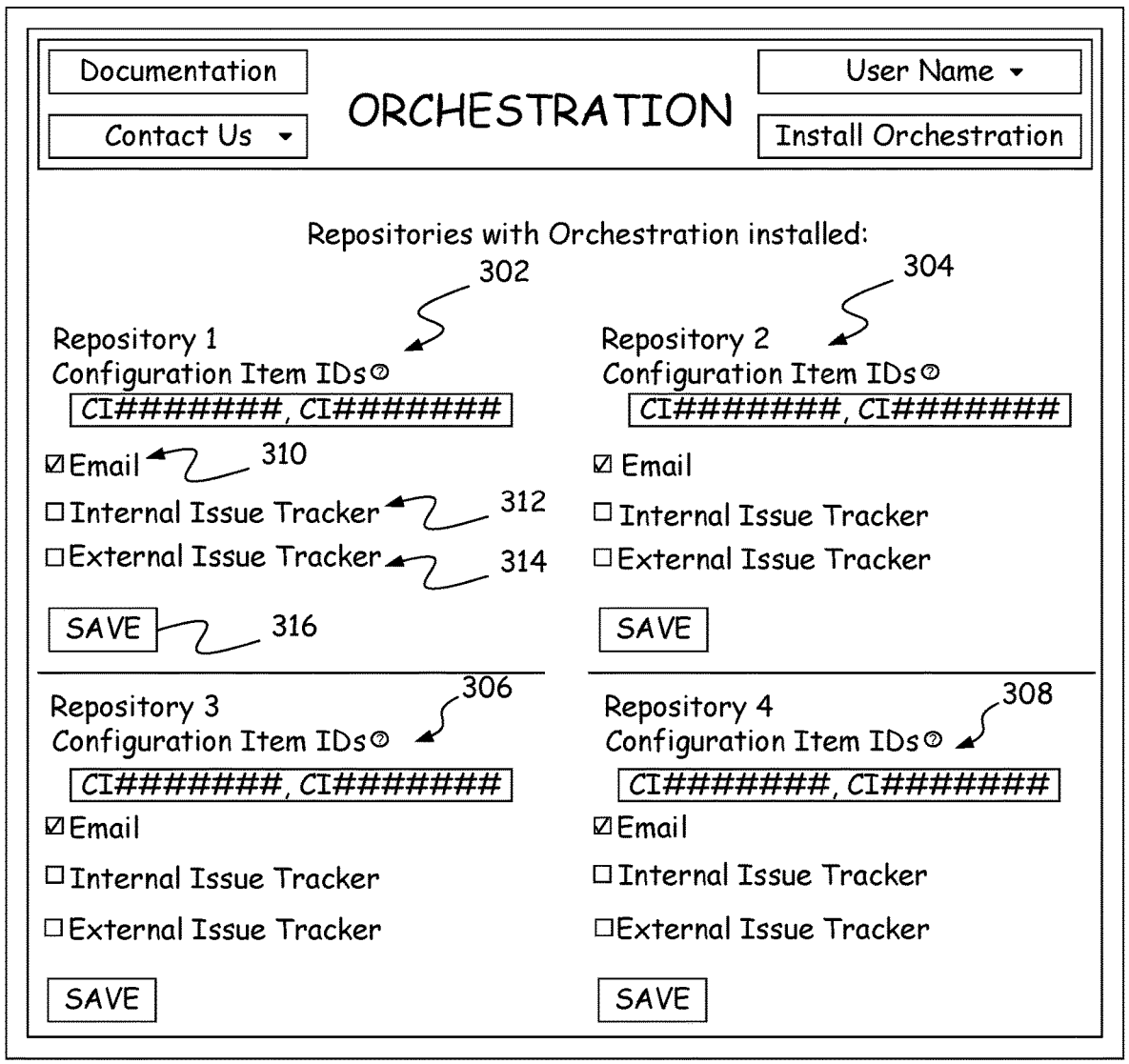
FIG. 3 provides a user interface showing organization-owned repositories that have installed a vulnerability orchestration application.

In accordance with one embodiment, the user logs into version control server 102 using OAuth credentials for an organization. Once these OAuth credentials have been verified and the user has given orchestration application 126 the necessary permissions using user interface 200, version control server 102 allows orchestration application 126 to identify all repositories that the user has access to and that have already implemented orchestration application 126. Initially, the list of repositories will only include repositories controlled by the organization on which orchestration application 126 has been implemented. FIG. 3 provides a user interface 300 showing such a list of repositories. In particular, user interface 300 lists repositories 302, 304, 306 and 308 as repositories that the user can access and that have already implemented orchestration application 126. For each repository, user interface 300 provides a list of issue options that the user can select from such as email option 310, internal issue tracker option 312 and external issue tracker option 314 for repository 302. The user is able to select one or more of these issue options for the repository and then select a SAVE control such as save control 316 to store the selected issue options for the user. Once the issue options have been selected, they will be used to convey security vulnerability issues found in branches of code in the repository.

If the email option is selected, the user will receive an email from email application 154 any time code committed by the user contains a security vulnerability. In accordance with one embodiment, the email will contain a list of security vulnerabilities found in the code files that are part of the commit.

If the internal issue tracker option is selected, internal issue tracker 152 will be used to generate and track a separate issue 158 for each security vulnerability detected in a branch. In accordance with one embodiment, internal issue tracker 152 is an issue tracker provided by version control server 102.

If the external issue tracker option is selected, external issue tracker 150 will be used to generate and track a separate issue 156 for each security vulnerability detected in a branch. In accordance with one embodiment, external issue tracker 152 is an issue tracker provided outside of version control server 102 but with links to version control server 102.

In accordance with one embodiment, issue tracking includes opening a new issue when a security vulnerability first appears in a branch, automatically closing the issue when the security vulnerability is no longer present in the branch, automatically reopening the issue if the security vulnerability reappears and allowing the user to designate the security vulnerability as a false positive vulnerability meaning that the security vulnerability should not be applied to the code in the repository.

Figure 4:
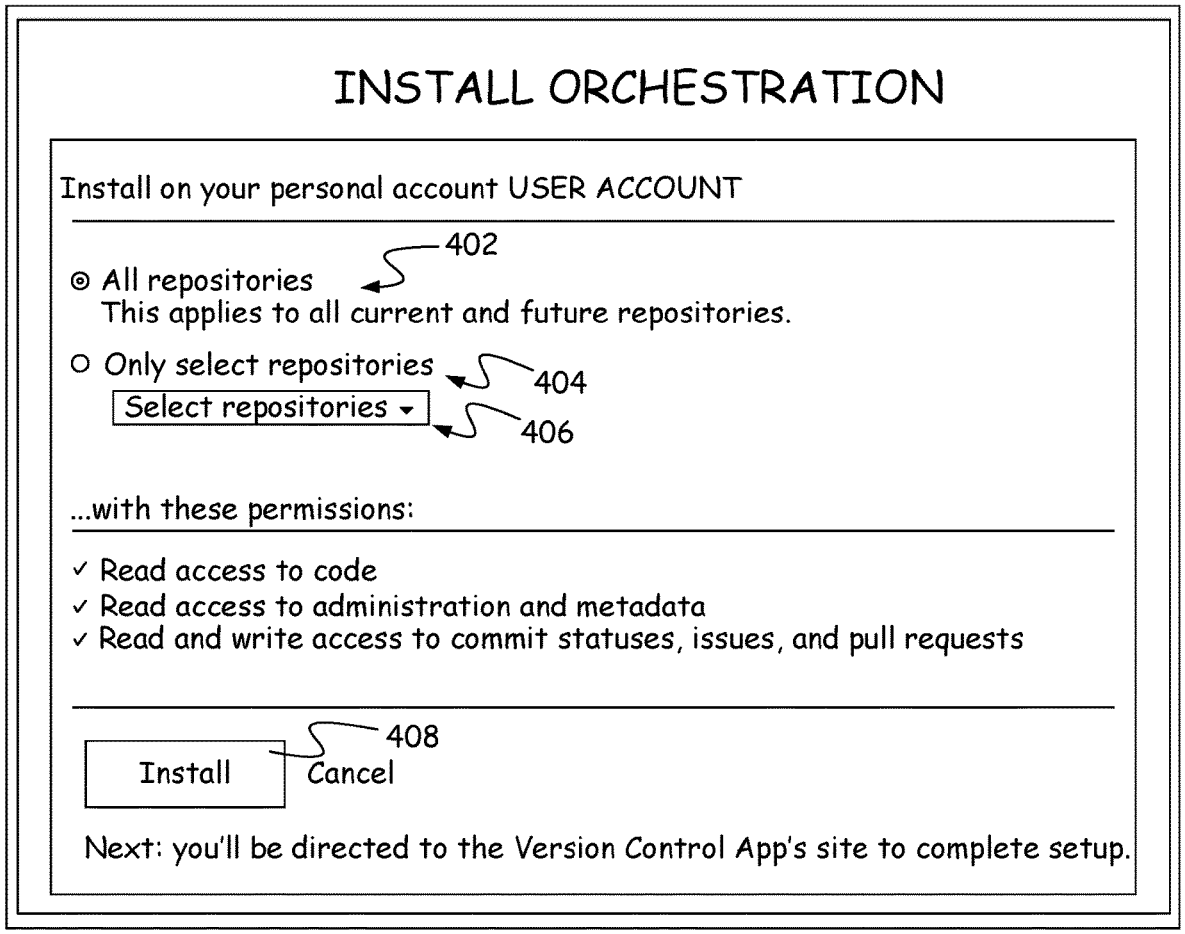

Once the user has logged into version control server 102, the user is also able to add orchestration application 126 to repositories that the user controls. FIG. 4 provides a user interface 400 that allows the user to request implementation of orchestration application 126 on version control repositories controlled by the user. In particular, the user is able to select between adding orchestration application 126 to all repositories controlled by the user using control 402 or to particular repositories controlled by the user using control 404 and pulldown 406. After the user selects which repository the orchestration application is to be implemented on, the user can select install button 408, which will cause the orchestration application to be added to the designated repositories and give the application the needed authorization.

Figure 5:
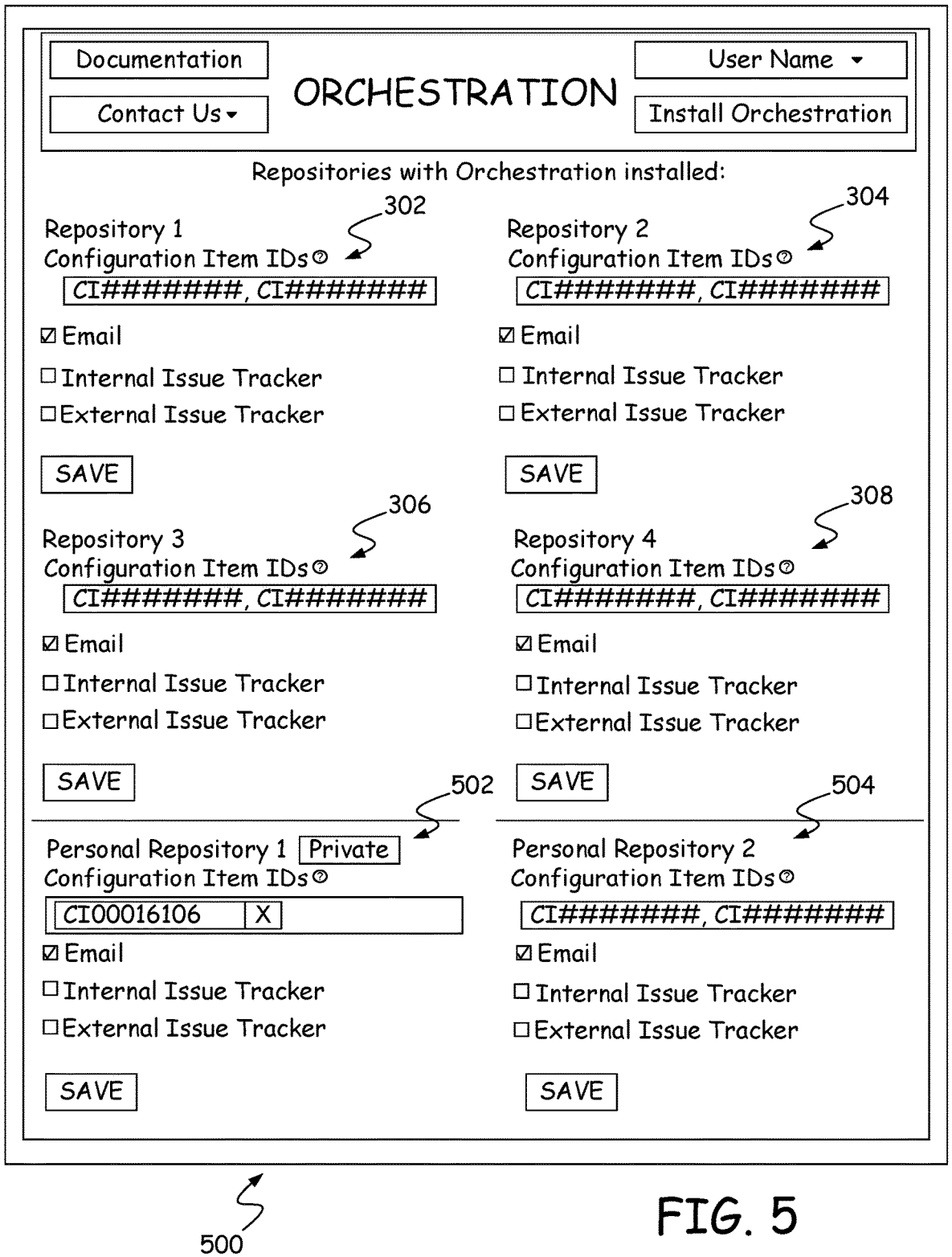
FIG. 5 is a user interface displaying the repositories accessible by a user that have installed a vulnerability orchestration application.

FIG. 5 provides an example user interface 500 showing the list of repositories with orchestration application 126 installed on them after the user selected their personal repositories using the interface of FIG. 4. In user interface 500, repositories 502 and 504, which are controlled by the current user, have been added to the list of repositories shown in FIG. 3. In user interface 500, the user is able to add or to select their desired issue tracking channel for all the repositories including the repositories controlled by the user.

Figure 6:
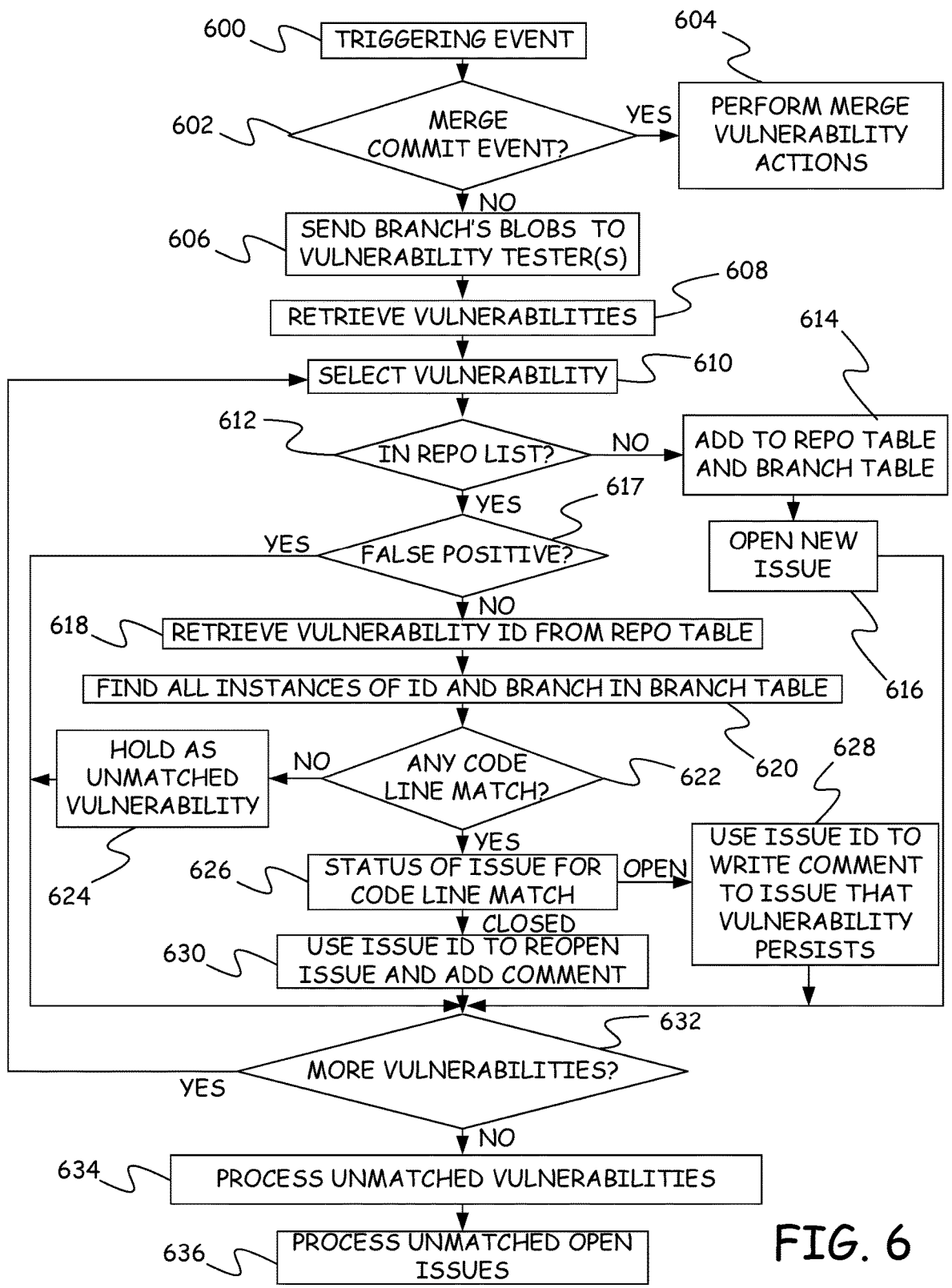
FIG. 6 is a flow diagram for opening and closing issues based on security vulnerabilities found in a branch.

FIG. 6 provides a flow diagram of an example method performed by orchestration application 126 and orchestration API 130 to orchestrate scanning for security vulnerabilities and managing issues associated with those vulnerabilities based on events that occur in version control server 102.

At step 600 of FIG. 6, a triggering event occurs on version control server 102 causing a web hook 132 to be triggered. Web hook 132 then causes orchestration application 126 to be invoked. Examples of possible triggering events include commits for a single branch of code and commits of merges of two branches of code, for example. When an event occurs, orchestration application 126 receives the identifier of the branch involved in the commit and the hash of the commit itself. For merged commits, orchestration application 126 receives the branch IDs of the two branches involved in the merge, and the hashes of the commits involved in the merge, the hash of a common ancestor commit of the two branches and the hash of the merged commit. Orchestration application 126 sends the information it acquires to orchestration API 130.

If the event is a commit merge event at step 602, orchestration API 130 performs merge vulnerability actions at step 604 as discussed further below. If the event is not a merge commit event, orchestration API 130 sends the identifier for the branch to SAST service 134 at step 606 to cause SAST service 134 to perform vulnerability scanning on the changed blobs in the commit. Thus, SAST service 134 scans changed computer instructions to detect vulnerabilities when the changed computer instructions are committed to the version control repository. The changed computer instructions include changes to a previous version of the computer instructions. In accordance with one embodiment, SAST service 134 performs this scanning by requesting the blobs through an SAST application 136 on version control server 102 and scanning the code text within each changed blob for known vulnerabilities. SAST service 134 then either sends the found vulnerabilities 138 to orchestration API 130 or returns the location of a file containing vulnerabilities 138 to orchestration API 130 so that orchestration API 130 can retrieve the vulnerabilities at step 608.

At step 610, orchestration API 130 selects one of the vulnerabilities identified in the code text associated with the branch. Orchestration API 130 then searches for the vulnerability in a repository (repo) vulnerabilities table 140 of a vulnerabilities database 142 maintained on vulnerability orchestration server 110. Repo vulnerabilities table 140 contains a separate entry for each line of code text in repository 112 that has been identified as a security vulnerability. Each entry includes the code text of the vulnerability, a unique identifier (ID) for the vulnerability, and whether this code text has been identified as a false positive vulnerability. A false positive vulnerability is one that SAST service 134 had incorrectly identified as a security vulnerability.

If the vulnerability selected at step 610 is not in repo vulnerabilities table 140, this is a new vulnerability for the repository. As a result, the vulnerability code text is assigned a unique vulnerability ID and is added to repo vulnerabilities table 140 at step 614. When a vulnerability is initially added to repo vulnerabilities table 140, it is marked as not being a false positive vulnerability.

In addition to adding the vulnerability to repo vulnerabilities table 140, orchestration API 130 also adds the vulnerability to branch vulnerabilities table 146 in vulnerability database 142. In accordance with one embodiment, branch vulnerabilities table 146 provides a separate entry for each unique combination of branch, vulnerability ID, blob and code line, where the code line indicates the location of the vulnerability in the blob. In addition to the branch identifier, vulnerability ID, hash of the blob and code line, each entry includes an issue identifier field that receives an identifier for an issue created for this occurrence of the vulnerability in this branch.

At step 616, orchestration API 130 instructs an issue tracker, such as external issue tracker 150 or internal issue tracker 152 to open a new issue for the vulnerability in the current branch. In response to the request, issue trackers 150 or 152 will create a corresponding issue in an issues database 156 or 158, where the issue describes the security vulnerability, the location of the vulnerability in the blob, as well as the severity of the vulnerability and when the issue was first created. Information stored for the issue allows all issues for a branch to be retrieved from the issue tracker.

If orchestration API 130 finds that the selected vulnerability is in repo vulnerabilities table 140 at step 612, orchestration API 130 then determines if the vulnerability is listed as a false positive in repo vulnerabilities table 140 at step 617. If the vulnerability has been marked as a false positive, orchestration API 130 does not open an issue for the vulnerability because the users of the repository have already indicated that the vulnerability is not a real issue. Note that the false positive marking for the vulnerability is made in repo vulnerabilities table 140. This allows the vulnerability's false positive status to be set for the entire repository instead of for a particular branch. As a result, if a vulnerability is found in a first branch and is then designated by the user as a false positive, the vulnerability will be designated as a false positive for all other branches in the repository including those branches that do not include the changes that produced the vulnerability in the first branch. Thus, even if a vulnerability has never appeared in a particular branch, the vulnerability can still be marked as a false positive for that branch because the vulnerability appeared in another branch of the repository and was marked as a false positive for that other branch. This improves the efficiency of issue tracking for a repository since the user does not have to designate the same vulnerability as a false positive for each branch that the vulnerability appears in. Instead, the user simply sets one occurrence of the vulnerability as a false positive and orchestration API 130 automatically treats future occurrences of the vulnerability in other branches as false positives.

If the vulnerability has not been marked as a false positive, orchestration API 130 retrieves the vulnerability ID for the vulnerability from repo vulnerabilities table 140 at step 618 and searches branch vulnerabilities table 146 for all entries that contain both the vulnerability ID and the branch ID in branch vulnerabilities table 146 at step 620.

For each entry that contains both the branch ID and the vulnerability ID, orchestration API 130 determines if the blob and code line for the current vulnerability matches the blob and code line of the entry. If none of the blobs and code lines matches the current selected vulnerability, the vulnerability is held as an unmatched vulnerability at step 624. If an entry in branch vulnerabilities table 146 contains the same blob and code line for the branch ID and vulnerability ID at step 622, the status of the issue for that occurrence of the vulnerability is examined at step 626. To examine the status, the issue ID is retrieved from branch vulnerabilities table 146 and is used by orchestration API 130 to request the status of the issue from issue tracker 150 or issue tracker 152, depending on which issue tracker created the issue.

If the issue for the vulnerability stored in branch vulnerabilities table 146 is currently open at step 626, orchestration API 130 instructs issue tracker 150/152 to write a new comment to the issue to indicate that the vulnerability persists in the branch at step 628. Together, steps 622, 626 and 628 involve matching open issues to vulnerabilities detected in the changed computer instructions of the latest commit by requiring for each match at least that the code text of the open issue matches the code text of the detected vulnerability and in some embodiments that the code line of the open issue matches the code line of the vulnerability.

If the issue for the code line is closed at step 626, orchestration API 130 uses the issue ID to reopen the issue and add a comment to the reopened issue indicating that the issue has reappeared in the blob for the branch at step 630. Thus, in steps 626 and 630, when changed computer instructions are committed to the version control repository and include a vulnerability identified in a closed issue, the closed issue is reopened. After steps 616, 624, 628 and 630 and if the current vulnerability has been marked as a false positive vulnerability at step 617, orchestration API 130 determines if there are more vulnerabilities in the retrieved vulnerabilities for the current scan of the branch at step 632. If there are more vulnerabilities, the process of FIG. 6 returns to step 610 to select the next vulnerability in the list of vulnerabilities detected in the latest scan of the branch. When there are no more vulnerabilities to process, orchestration API 130 processes all unmatched vulnerabilities at step 634 where an unmatched vulnerability is a vulnerability that was held at step 624 because the blob and code line of the vulnerability did not match the blob and code line of any vulnerabilities stored for the branch in branch vulnerabilities table 146.

Figure 7:
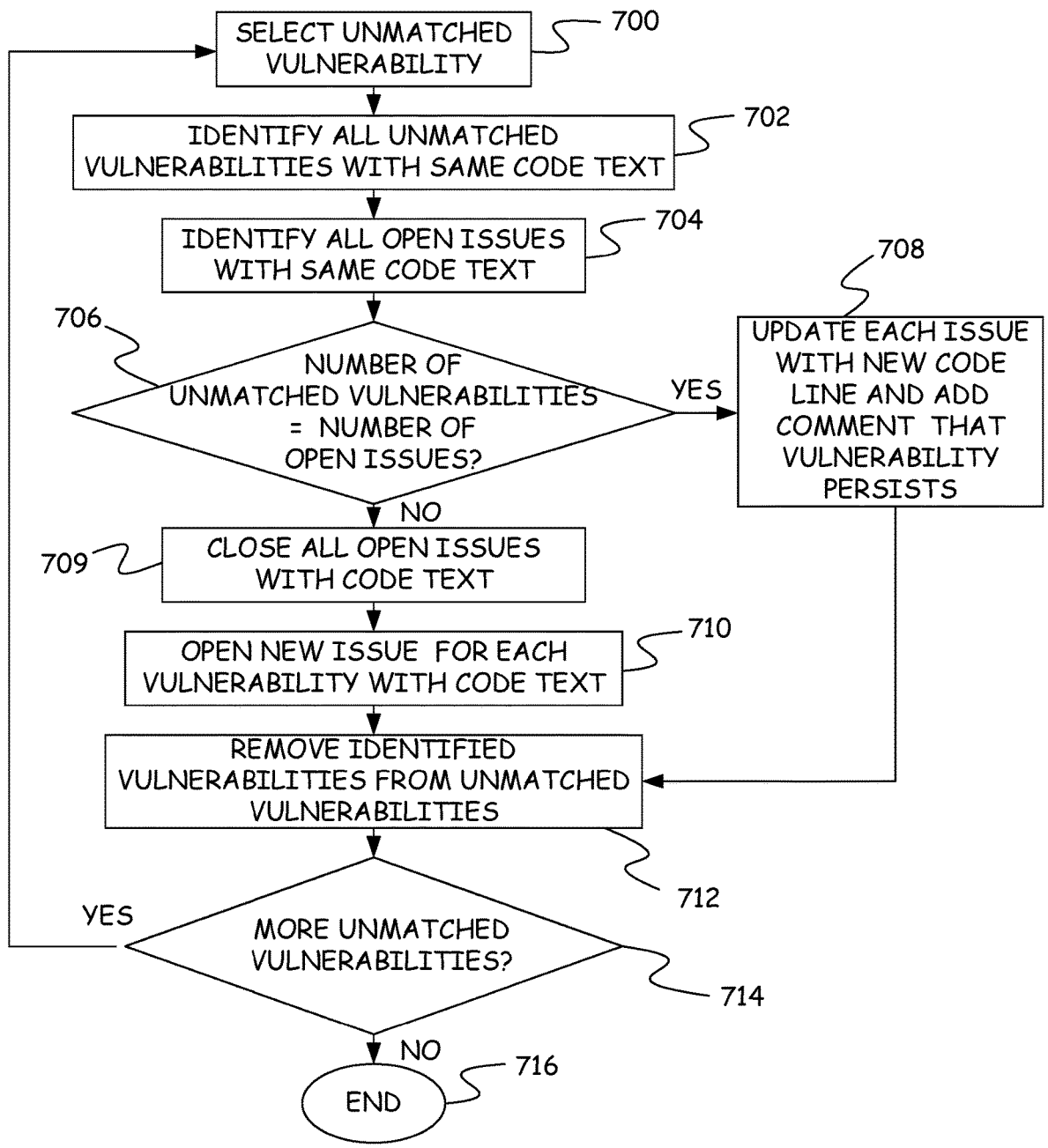
FIG. 7 is a flow diagram for closing and opening issues for unmatched vulnerabilities.

FIG. 7 provides a flow diagram for processing unmatched vulnerabilities in step 634. At step 700, one of the unmatched vulnerabilities is selected. At step 702, the code text for the selected vulnerability is compared to the code text of all other unmatched vulnerabilities in the list of unmatched vulnerabilities to identify all of the unmatched vulnerabilities with the same code text in the same blob. At step 704, orchestration API 130 identifies all open issues with the same code text for the same blob. In accordance with one embodiment, orchestration API 130 performs this by searching branch vulnerabilities table 146 for all occurrences of the branch ID and vulnerability ID for the blob and then requesting the status of all issues associated with those occurrences from the corresponding issue tracker 150 or 152. At step 706, orchestration API 130 determines if the number of unmatched vulnerabilities with the code text equals the number of open issues with the code text. If the numbers match, orchestration API 130 assumes that the code text has simply shifted within the blob and as a result at step 708, orchestration API 130 updates each issue with the new code line of one of the unmatched vulnerabilities and adds a comment to each issue that the vulnerability persists.

If the number of unmatched vulnerabilities does not equal the number of open issues with the same code text, all of the open issues with the code text are closed at step 709 and a new issue is opened for each of the unmatched vulnerabilities with the same code text at step 710. Thus, if there are four unmatched vulnerabilities with the same code text in the same blob, four new issues are opened at step 710. After step 708 or step 710, the vulnerabilities identified at step 702 are removed from the list of unmatched vulnerabilities at step 712. At step 714, orchestration API 130 determines if there are more unmatched vulnerabilities and if there are more unmatched vulnerabilities, the process of FIG. 7 returns to step 700 and step 702-714 are repeated. When there are no more unmatched vulnerabilities at step 714, the process of FIG. 7 ends at step 716.

Figure 8:
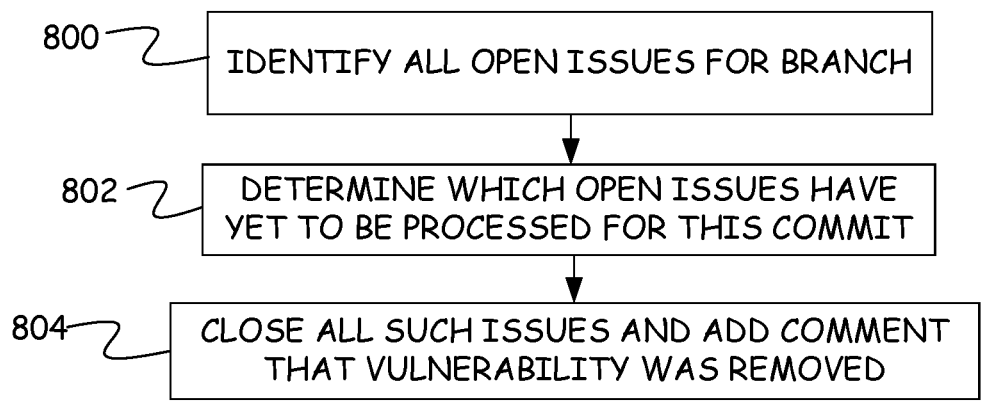
FIG. 8 is a flow diagram of a method for closing open issues for security vulnerabilities that are no longer present in a branch.

Returning to FIG. 6, after step 634, orchestration API 130 processes unmatched open issues for the branch at step 636. FIG. 8 provides a flow diagram for processing such unmatched open issues. At step 800 of FIG. 8, orchestration API 130 identifies all open issues for the current branch. In accordance with one embodiment, orchestration API 130 determines which issues are open by identifying every vulnerability in branch vulnerabilities table 146 for the branch, retrieving the issue IDs for each such vulnerability, and requesting the status of those issues from the corresponding issue tracker 150/152.

At step 802, orchestration API 130 determines which of the open issues have yet to be processed for this commit. In accordance with one embodiment, an open issue has been processed if a comment has been added to the issue to indicate that the issue persists or the issue has been opened or reopened with this commit. Conversely, an open issue has not been processed if the vulnerability associated with the open issue was not matched to a vulnerability detected in the changed computer instructions of the commit and thus the open issue's vulnerability is not present in the vulnerabilities detected in the changed computer instructions.

The unprocessed open issues at step 802 represent vulnerabilities that were found in a previous commit for the branch but were not found in the latest commit for the branch. Thus, step 802 involves identifying that one or more vulnerabilities associated with an open issue for a previous version of computer instructions is not present in the set of vulnerabilities detected in the most recent changes to the computer instructions.

Since the vulnerability has been removed in the latest commit, the corresponding open issue for the vulnerability has been resolved and the open issue can be automatically closed at step 804. To close the open issues, orchestration API 130 calls the corresponding issue tracker 150/152 with a separate instruction to close each unprocessed open issue identified in step 802. By automatically closing open issues for vulnerabilities that are no longer present in committed code, the embodiments remove a step that the programmer would otherwise have to perform to close the issue. This further improves the technology by removing the possibility that the programmer will forget to close the open issue after resolving the code vulnerability. When programmers forget to close open issues, the issue tracker becomes unreliable and is no longer able to provide an accurate indication of the state of the committed code.

Figure 9:
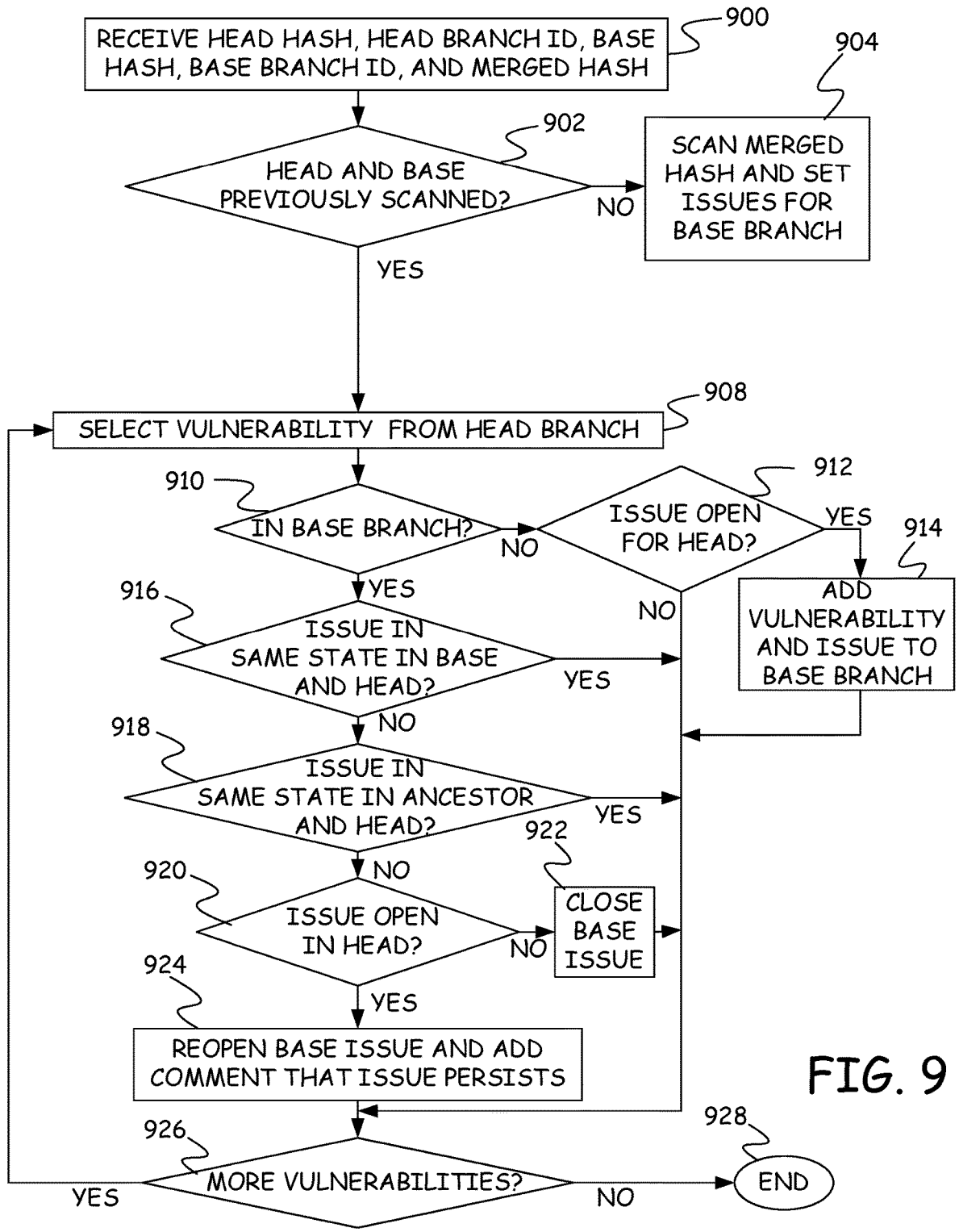
FIG. 9 provides a flow diagram for opening and closing issues associated with a commit of a merged branch.

FIG. 9 provides a flow diagram of a method of processing vulnerabilities and issues when a commit of merged branches is received at step 604. At step 900, orchestration API 130 receives the head branch ID and the head hash for the branch that was merged into the base branch as well as the base branch ID and base hash for the base branch. In addition, the merged hash for the merged commit and a common ancestor hash for the first common commit of the head branch and the base branch are received.

At step 902, orchestration API 130 determines if the committed code represented by the head hash and the base hash have both been previously scanned. If either the head hash or the base hash has not been scanned, orchestration API 130 instructs SAST service 134 to scan the merged commit code at step 904. Steps 608-626 of FIG. 6 are then performed for the merged commit code while using the base branch ID as the current branch. Thus, if one or both of the head code or base code have not been scanned, a full scan of the merged code is performed at step 904.

If the code for the head hash and the base hash were scanned before being merged at step 902, orchestration API 130 retrieves a vulnerability entry for the head hash from branch vulnerabilities table 146 at step 908. In accordance with one embodiment, the retrieved vulnerability entry can be for an open issue or a closed issue. At step 910, orchestration API 130 determines if the selected head hash vulnerability is present in the base hash. In accordance with one embodiment, this involves searching branch vulnerabilities table 146 for any entry that has the same vulnerability ID, blob identifier and code line as the head hash vulnerability but that designates the base branch instead of the head branch. The found base branch vulnerability, if any, can have an open or closed issue for the base branch.

If the vulnerability is not present in the base branch, then orchestration API 130 determines if the corresponding issue is open for the head branch at step 912. If the corresponding issue is not open, it means that the vulnerability was introduced into the head branch after the head branch forked from the base branch and has since been removed from the head branch. As a result, no vulnerability needs to be added to the base branch. If the corresponding issue is open for the head branch, it means that the vulnerability was introduced into the head branch after the head branch forked from the base branch and that the vulnerability is still present in the head branch. As a result, when the head branch is merged into the base branch, the vulnerability in the head branch will be introduced into the base branch. To address this, orchestration API 130 adds a vulnerability entry to branch vulnerabilities table 146 for the base branch that identifies the selected head branch vulnerability and instructs one or both of the issue trackers to open a new issue for the base branch at step 914.

If the selected vulnerability is present in the base branch at step 910, orchestration API 130 determines if the issues for the vulnerability are in the same state for the head branch and the base branch at step 916. If the issues are in the same state (both opened or both closed), no change needs to be made to the base branch. If the issues are not in the same state, orchestration API 130 determines if the issue for the head branch is in the same state as the issue was in for the common ancestor hash at step 918. If those two issues are in the same state, it means that the state of the issue has changed for the base branch (the vulnerability has either been removed or reintroduced). During the merge, this change will be kept in the base branch. As such, no changes need to be made to the vulnerabilities and issues of the base branch.

If the issue of the head branch is in a different state from the state the issue was in for the common ancestor at step 918, it means that the vulnerability has either been removed or reintroduced in the head branch. To determine whether the vulnerability has been removed or reintroduced in the head branch, the status of the issue for the head branch is examined at step 920. If the status is open, the vulnerability has been reintroduced into the head branch and this reintroduction will be merged into the base branch. As a result, the issue must be reopened for the base branch at step 924 and a comment indicating that the vulnerability persists in the base branch must be added. If the status of the issue in the head branch is closed, the vulnerability has been removed from the head branch and this removal was merged into the base branch during the merge. As a result, the issue for the base branch is closed in step 922.

After the issues and vulnerabilities for the base branch have been changed or if the issues and vulnerabilities for the base branch do not have to be changed, orchestration API 130 determines if there are more vulnerabilities for the head branch at step 926. If there are more vulnerabilities, another vulnerability is selected by returning to step 908 and steps 910-926 are repeated. When all of the vulnerabilities in the head task have been process, the method of FIG. 9 ends at step 928.

Figure 10:
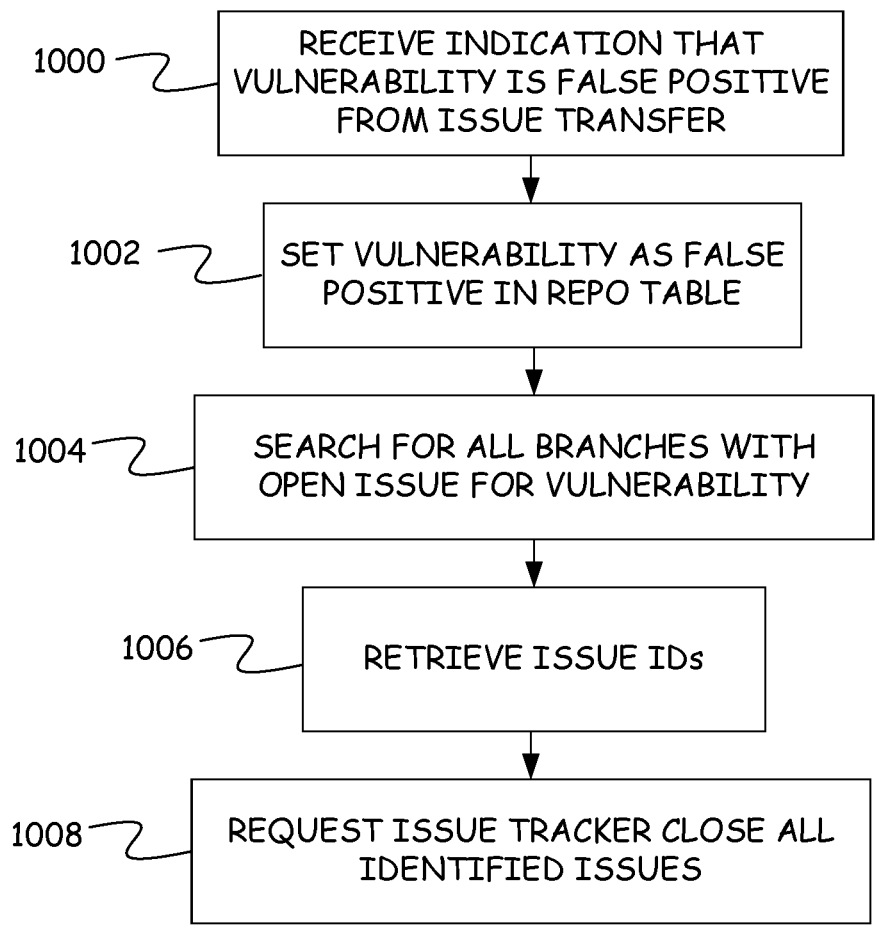
FIG. 10 provides a flow diagram for processing false positive security vulnerabilities.

In accordance with one embodiment, false positive indications provided for one branch of a repository are automatically applied to all branches of the repository. FIG. 10 provides a flow diagram of a method for applying such false positives to other branches. In step 1000, orchestration API 130 receives an indication that an issue has been marked as a false positive from one of the issue trackers 150/152. At step 1002, orchestration API 130 sets the vulnerability as a false positive in repo vulnerabilities table 140. At step 1004, orchestration API 130 searches for all branches with an open issue for the vulnerability in branch vulnerabilities table 146. At step 1006, orchestration API 130 retrieves the issue IDs for each found vulnerability from branch vulnerabilities table 146 and at step 1008 requests that issue tracker 150/152 close all of the identified issues.

Figure 11:
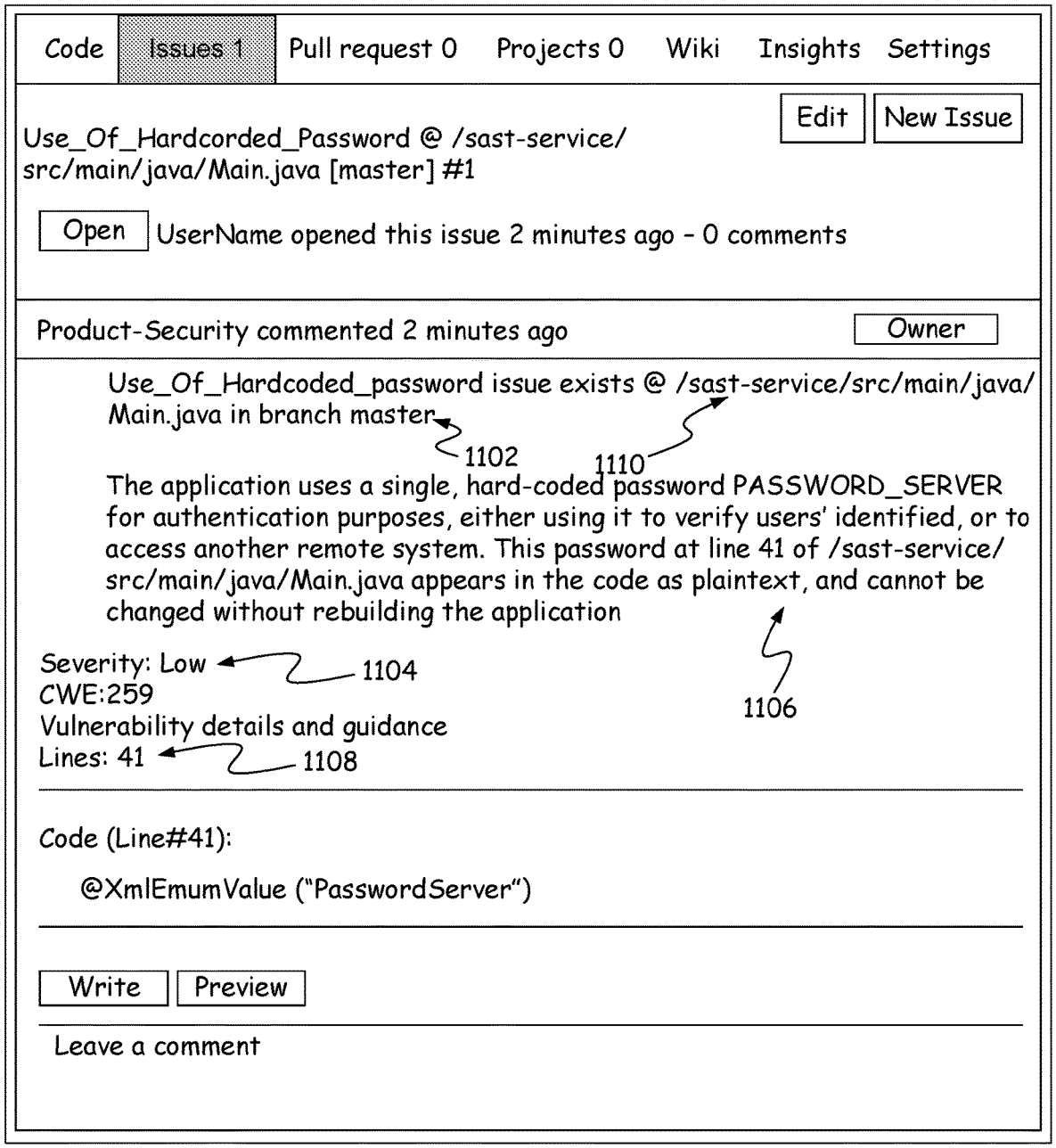
FIG. 11 provides an example of a user interface showing an issue when a security vulnerability is first discovered in a branch.

As discussed above, orchestration API 130 automatically interacts with issue trackers 150/152 based on scanning results from SAST service 134. FIGS. 11-16 provide various user interfaces generated by issue tracker 150/152 and by email app 154 based on the interactions from orchestration API 130. FIG. 11 provides a user interface 1100 showing an issue generated by internal issue tracker 152 when a vulnerability is first detected in a branch. In particular, user interface 1100 indicates that the vulnerability was identified in the master branch in heading 1102 and provides an indication of the severity 1104, a description of the vulnerability 1106 and the line where the vulnerability is found 1108. Further, user interface 1100 indicates the path 1110 of the blob containing the vulnerability.

FIG. 12 provides a user interface 1200 showing the same issue as FIG. 11 after orchestration API 130 has determined that a subsequence scan of a later commit of the master branch found the same vulnerability. FIG. 12 includes the same information as FIG. 11 with an additional comment 1202 indicating that the vulnerability still exists in the code. FIG. 13 provides an example user interface 1300 showing the same issue as FIGS. 11 and 12 when the vulnerability has been removed from the master branch. As noted above, orchestration API 130 determined that the vulnerability was removed because a vulnerability found in an open issue of the master branch was not found in the commit of the master branch. In user interface 1300, orchestration API 130 has added a comment 1302 indicating that the issue no longer exists in the master branch at line 41 of the identified blob. FIG. 14 provides an example user interface 1400 showing the same issue of FIGS. 11-13 when the latest scan of the master branch indicates that the scan vulnerability has reappeared in the blob at line 41. As a result, orchestration API 130 has added comment 1402 indicating that the issue still persists. Thus, this issue has gone from being opened, continuing to be opened, being closed, and then being reopened.

Figure 15:
FIG. 15 provides a history of code commits for a branch.

FIG. 15 provides an example of user interface 1500 showing a log of past commits for the master branch. FIG. 16 provides an example user interface 1600 for an issue generated by an external issue tracker 150. The user interface for the external issue tracker includes a branch identifier 1602, a vulnerability description 1604, a line identifier where the vulnerability is found 1606 and a blob identifier 1608 for the file containing the vulnerability.

FIG. 17 provides an example user interface 1700 of an e-mail provided by e-mail application 154 showing the results of a scan that provides a list 1702 of all vulnerabilities found in the committed branch.

Figure 18:
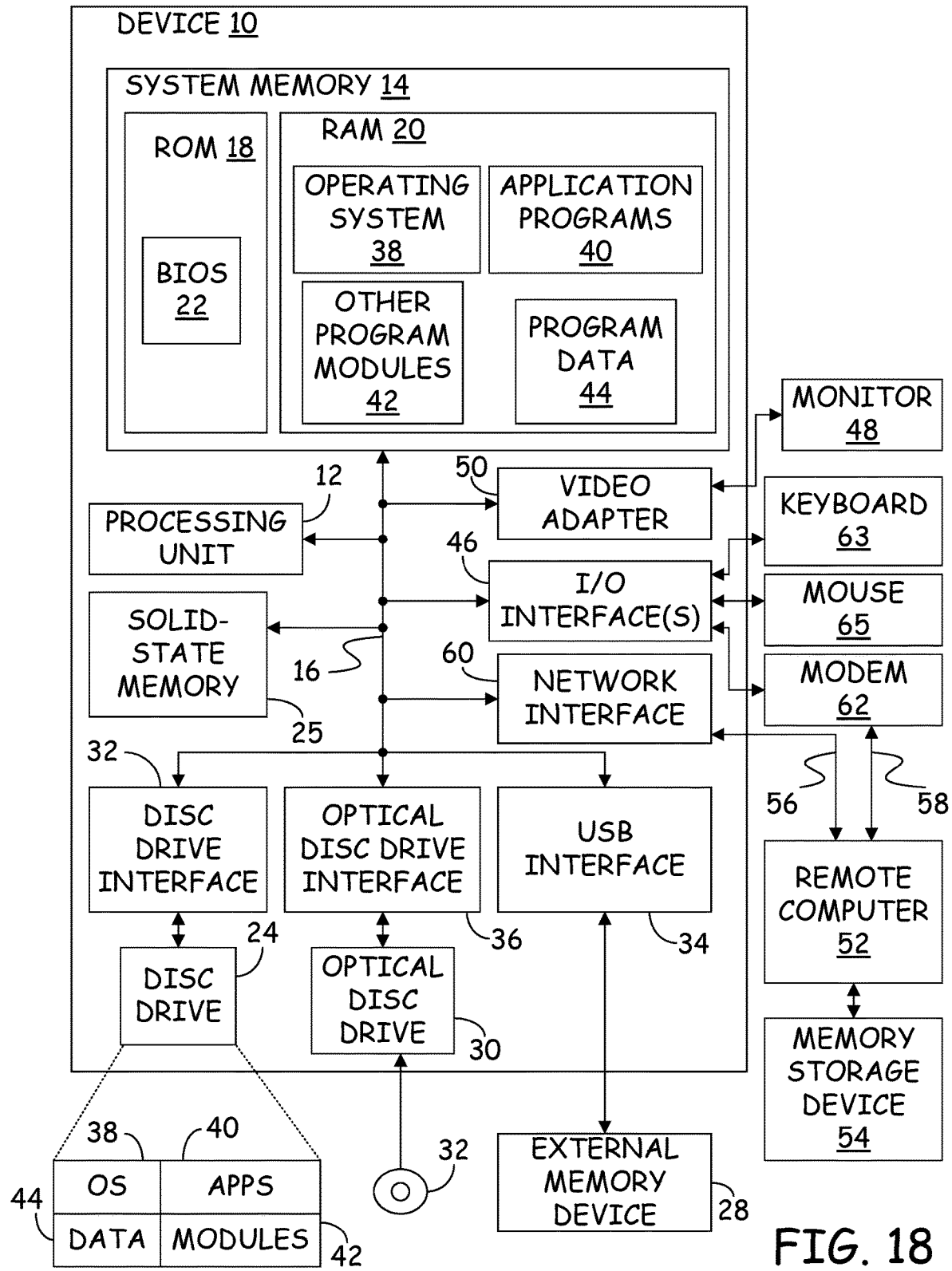
FIG. 18 provides a block diagram of a computing device used to implement the various servers of the system in accordance with one embodiment.

FIG. 18 provides an example of a computing device 10 that can be used as a server or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 18. The network connections depicted in FIG. 18 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 18 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:
1. A computer server comprising:
  a memory containing instructions and a database comprising vulnerabilities detected in a previous version of a branch of computer code and vulnerabilities detected in a base branch and a head branch of computer code;
  a processor executing the instructions in the memory to perform steps comprising:
    receiving vulnerabilities detected in a last-committed version of the branch of computer code;

determining that a vulnerability stored in the database for the previous version of the branch of computer code is not in the received vulnerabilities for the last-committed version of the branch of computer code;

in response, instructing an issue tracker to close an issue opened for the vulnerability for the branch of code;

receiving an indication that a commit of a merge of the head branch into the base branch has been received; and reading the vulnerabilities detected in the head branch from the database and adding the vulnerabilities detected in the head branch and read from the database to the vulnerabilities stored in the database for the base branch based on a determination that a latest scan of the base branch failed to detect the vulnerabilities in the base branch.

2. The computer server of claim 1 wherein the processor executes the instructions in memory to further perform steps comprising:

determining that a second vulnerability stored in the database for the previous version of the branch of computer code is in the received vulnerabilities for the last-committed version of the branch of computer code; and in response, instructing an issue tracker to add a comment to an open issue for the second vulnerability for the branch to indicate that the second vulnerability was still present in the last-committed version of the branch of computer code.

3. The computer server of claim 1 wherein the processor executes the instructions in memory to further perform steps comprising:

determining that a third vulnerability stored in the database and marked as a false positive vulnerability is in the received vulnerabilities for the last-committed version of the branch of computer code; and in response, not opening an issue for the third vulnerability.

4. The computer server of claim 3 wherein the third vulnerability marked as a false positive was never present in any version of the branch of computer code before the last-committed version of the branch of computer-code.

5. The computer server of claim 1 wherein the processor executes the instructions in memory to further perform steps comprising:

receiving an indication that a fourth vulnerability in a first branch of computer code stored in a repository is a false positive vulnerability;

searching for open issues for the false positive vulnerability for other branches of computer code stored in the repository; and for each found open issue, instructing the issue tracker to close the found open issue.

6. The computer server of claim 1 wherein the processor executes the instructions in memory to further perform steps comprising:

determining that a fifth vulnerability stored in the database for an earlier version of the branch of computer code is in the received vulnerabilities for the last-committed version of the branch of computer code; and in response, instructing the issue tracker to reopen a closed issue for the vulnerability for the branch of code.

7. A method executed by a processor, the method comprising:

receiving vulnerabilities detected in a last-committed version of a branch of computer code;

determining that a vulnerability stored in a database for a previous version of the branch of computer code is not in the received vulnerabilities for the last-committed version of the branch of computer code;

in response, instructing an issue tracker to close an issue opened for the vulnerability for the branch of code;

receiving an indication that a commit of a merge of a head branch into a base branch has been received; and reading vulnerabilities detected in the head branch from the database and adding the vulnerabilities detected in the head branch and read from the database to vulnerabilities stored in the database for the base branch based on a determination that a latest scan of the base branch failed to detect the vulnerabilities in the base branch.

8. The method of claim 7 further comprising:

determining that a second vulnerability stored in the database for the previous version of the branch of computer code is in the received vulnerabilities for the last-committed version of the branch of computer code; and in response, instructing an issue tracker to add a comment to an open issue for the second vulnerability for the branch to indicate that the second vulnerability was still present in the last-committed version of the branch of computer code.

9. The method of claim 7 further comprising:

determining that a third vulnerability stored in the database and marked as a false positive vulnerability is in the received vulnerabilities for the last-committed version of the branch of computer code; and in response, not opening an issue for the third vulnerability.

10. The method of claim 9 wherein the third vulnerability marked as a false positive was never present in any version of the branch of computer code before the last-committed version of the branch of computer-code.

11. The method of claim 7 further comprising:

receiving an indication that a fourth vulnerability in a first branch of computer code stored in a repository is a false positive vulnerability;

searching for open issues for the false positive vulnerability for other branches of computer code stored in the repository; and for each found open issue, instructing the issue tracker to close the found open issue.

12. The method of claim 7 further comprising:

determining that a fifth vulnerability stored in the database for an earlier version of the branch of computer code is in the received vulnerabilities for the last-committed version of the branch of computer code; and in response, instructing the issue tracker to reopen a closed issue for the vulnerability for the branch of code.

13. A non-transitory computer-readable medium containing computer-executable instructions for performing steps comprising:

receiving vulnerabilities detected in a last-committed version of a branch of computer code;

determining that a vulnerability stored in a database for a previous version of the branch of computer code is not in the received vulnerabilities for the last-committed version of the branch of computer code;

in response, instructing an issue tracker to close an issue opened for the vulnerability for the branch of code;

receiving an indication that a commit of a merge of a head branch into a base branch has been received; and reading vulnerabilities detected in the head branch from the database and adding the vulnerabilities detected in the head branch and read from the database to vulnerabilities stored in the database for the base branch based on a determination that a latest scan of the base branch failed to detect the vulnerabilities in the base branch.

14. The non-transitory computer-readable medium of claim 13 further comprising:

determining that a second vulnerability stored in the database for the previous version of the branch of computer code is in the received vulnerabilities for the last-committed version of the branch of computer code; and in response, instructing an issue tracker to add a comment to an open issue for the second vulnerability for the branch to indicate that the second vulnerability was still present in the last-committed version of the branch of computer code.

15. The non-transitory computer-readable medium of claim 13 further comprising:

determining that a third vulnerability stored in the database and marked as a false positive vulnerability is in the received vulnerabilities for the last-committed version of the branch of computer code; and in response, not opening an issue for the third vulnerability.

16. The non-transitory computer-readable medium of claim 15 wherein the third vulnerability marked as a false positive was never present in any version of the branch of computer code before the last-committed version of the branch of computer-code.

17. The non-transitory computer-readable medium of claim 13 further comprising:

receiving an indication that a fourth vulnerability in a first branch of computer code stored in a repository is a false positive vulnerability;

searching for open issues for the false positive vulnerability for other branches of computer code stored in the repository; and for each found open issue, instructing the issue tracker to close the found open issue.

18. The non-transitory computer-readable medium of claim 13 further comprising:

determining that a fifth vulnerability stored in the database for an earlier version of the branch of computer code is in the received vulnerabilities for the last-committed version of the branch of computer code; and in response, instructing the issue tracker to reopen a closed issue for the vulnerability for the branch of code.

* * * * *